US012608298B2

(12) United States Patent
Pilgun

(10) Patent No.: US 12,608,298 B2
(45) Date of Patent: Apr. 21, 2026

(54) MULTIDEX ANDROID APP INSTRUMENTATION FOR CODE COVERAGE MEASUREMENT

(71) Applicant: Aleksandr Pilgun, Rodange (LU)

(72) Inventor: Aleksandr Pilgun, Rodange (LU)

( * ) Notice: Subject to any disclaimer, the term of this patent is extended or adjusted under 35 U.S.C. 154(b) by 111 days.

(21) Appl. No.: 18/368,606

(22) Filed: Sep. 15, 2023

(65) Prior Publication Data

US 2024/0095152 A1     Mar. 21, 2024

(30) Foreign Application Priority Data

Sep. 21, 2022    (LU) ........................................ 502820

(51) Int. Cl.
*G06F 11/3668*        (2025.01)
*G06F 11/362*          (2025.01)

(52) U.S. Cl.
CPC ...... *G06F 11/3676* (2013.01); *G06F 11/3644* (2013.01)

(58) Field of Classification Search
CPC .......................... G06F 11/3676; G06F 11/3644
USPC ................................................. 717/120–178
See application file for complete search history.

(56) References Cited

U.S. PATENT DOCUMENTS

| | | | | |
|---|---|---|---|---|
| 5,966,702 | A | * | 10/1999 | Fresko ................ G06F 9/44563 |
| 10,547,626 | B1 | * | 1/2020 | Xiao ..................... H04L 63/145 |
| 12,170,679 | B2 | * | 12/2024 | Xu ......................... G06N 20/00 |
| 2013/0117854 | A1 | * | 5/2013 | Britton ................. G06F 21/567 |
| | | | | 726/24 |
| 2014/0351947 | A1 | * | 11/2014 | Shim ...................... G06F 21/57 |
| | | | | 726/26 |
| 2021/0049005 | A1 | * | 2/2021 | Yehuda ............... G06F 9/44526 |

OTHER PUBLICATIONS

Arnatovich, Yauhen Leanidavich, et al. "A comparison of android reverse engineering tools via program behaviors validation based on intermediate languages transformation." IEEE Access 6 (2018): pp. 12382-12394. (Year: 2018).*

(Continued)

*Primary Examiner* — Satish Rampuria

(57)        ABSTRACT

A method to instrument a multidex Android application for code coverage measurement is described. The method considers structure and DEX limitations of a multidex Android application opposed to the previous single-DEX solution. The method introduces additional steps to bypass the DEX limitations in smali representation of Android app bytecode. The method creates one supplementary smali class per DEX for probe arrays allocation. The method creates additional smali classes directory for supplementary classes. The method counts smali classes fields in newly created classes and rearranges those having the overflow due to DEX limitations. The method counts code entities in the newly created smali_classes directory and creates additional smali directories when the method number overflows. The method bypasses DEX method length limitation when reading generated class fields by reflecting the fields while correcting the array order with regards to their naming convention. An embodiment of the method allows to generate a code coverage report in a multidex format considering probes execution information obtained from testing of a multidex Android application.

2 Claims, 3 Drawing Sheets

(56)　　　　　　　References Cited

OTHER PUBLICATIONS

Hoffmann, Johannes, et al. "Slicing droids: program slicing for smali code." Proceedings of the 28th Annual ACM Symposium on Applied Computing. 2013. pp. 1844-1851. (Year: 2013).*

Wang, Wenyu, Wing Lam, and Tao Xie. "An infrastructure approach to improving effectiveness of Android UI testing tools." Proceedings of the 30th ACM SIGSOFT International Symposium on Software Testing and Analysis. 2021. pp. 165-176. (Year: 2021).*

Pooryousef, Shahrooz, and Morteza Amini. "Enhancing Accuracy of Android Malware Detection using Intent Instrumentation." ICISSP. 2017. pp. 380-388. (Year: 2017).*

Buddhdev, Bharat, et al. "DynaDroid: dynamic binary instrumentation based app behavior monitoring framework." Proceedings of the 8th International Conference on Security of Information and Networks. 2015. pp. 1-4 (Year: 2015).*

You, Wei, et al. "Taintman: An art-compatible dynamic taint analysis framework on unmodified and non-rooted android devices." IEEE Transactions on Dependable and Secure Computing 17.1 (2017): pp. 209-222. (Year: 2017).*

* cited by examiner (a)                                                    (b)

MULTIDEX ANDROID APP INSTRUMENTATION FOR CODE COVERAGE MEASUREMENT

TECHNICAL FIELD

The present disclosure describes computer methods for low-level code manipulations applicable to multidex Android™ applications for instrumentation purposes, such as code coverage measurement.

BACKGROUND

Android application (app) is a software program that can be uploaded, installed, and executed on an Android device. Android app contains compiled code and other supplementing materials such as icons, pictures, markup files, XML files. When executed the app is to provide particular services including visual experience to the end user of the Android device.

Android system accepts Android apps distributed in the form of binary packages having the APK extension. An app may be packaged into a single or more APK files.

The main package would be called then base.apk inside Android system installation directory. The base APK usually contains the main functioning app code and resources, while other APK files may contain libraries and supplementary material that may vary from one to another Android device.

The base APK comprises of at least one Dalvik Executable (DEX) file. DEX is the binary format for Android app executable. DEX files contain the actual binary code that Android system unpacks and translates into instructions directly executed on the Android device by the Android Runtime (ART).

For more complex applications compiler distributes code over multiple DEXs inside a single APK due to DEX format limitations. For example, Android limits the number of methods inside a single DEX file to only 65536. Thus, an app that contains multiple DEXs is called the multidex app. Multidex challenge is well known Android developers Java community. However, this common knowledge does not apply to our instrumentation approach since our solution processes already compiled multidex applications and works on the disassembled representation of the bytecode.

DEX files can be disassembled into the smali representation. When an Android application is disassembled, it results in a 'smali' directory that corresponds to the primary DEX file. All supplementary DEX files are disassembled into separate smali directories, typically denoted as 'smali_classes2', 'smali_classes3', and so forth. This work utilizes smali representation for measuring code coverage in $3^{rd}$ party Android apps.

Code coverage is a metric to measure the amount of executed code for an app. It is often used to measure the efficiency of testing procedures by app producers and to highlight the actually executed code for future in-depth analyses.

Typically, code coverage tools insert so-called instrumentation probes—specific instructions placed through the original app code to track its execution. When executed, such probes mark the corresponding array cell referenced by the probe identifier. The code coverage tool then maps the resulting execution information onto the original lines of code to highlight the executed lines in the code coverage report.

In the study by Pilgun et al., titled "Fine-grained code coverage measurement in automated black-box Android testing", the code coverage measurement approach has been implemented in a tool called ACVTool. ACVTool is a publicly available state of the art tool that measures code coverage at instruction-, method- and class-level for third-party Android apps. ACVTool disassembles an app using apktool, inserts probes into the smali code (human readable representation of binary code) and assembles the app again. Thus, one can run the app, and generate the code coverage report among app classes in the smali representation. The presented approach works well on most of single-DEX Android apps.

In another study by Pilgun A., titled "Don't Trust Me, Test Me: 100% Code Coverage for a 3rd-party Android App", the extended ACVTool version was integrated into the new tool called ACVCut to shrink single-DEX apps based on the code coverage produced by ACVTool.

However, the public version of ACVTool (as well as any other code coverage tool) does not address the multidex structure of Android apps and the corresponding DEX limitations. Besides the limit of 65536 methods inside a single DEX file, a class may fit up to 65536 fields, and a single method may fit up to 65536 instructions. Secondly, ACVTool instruments only one DEX file and creates supplementary code files in the same DEX increasing the number of classes, fields, methods, and instructions in that same DEX file. These limitations create a prohibitive challenge for code coverage measurement in a multidex Android app. Thus, the existing single-DEX approach needs an extension to support multidex instrumentation taking into account the Android DEX format limitations.

ACVTool utilizes Apktool to repackage Android apps. Further, Apktool handles APK resources and repack-ages its DEX files using the baksmali/smali library. The baksmali project utilizes the dexlib2 library that can read and transform only a single DEX file into the smali representation. The new initiative, called the multidexlib2 library, was rigorously discussed and then implemented to allow for APK patching in multidex format.

However, the multidexlib2 library was created for the DexPatcher tool. DexPatcher allows developers patching APKs directly in the Android Studio. The DexPatcher tool reflects the bytecode from multiple DEX files into Java code so that developers could read familiar Java code representation. In this case, the multidexlib2 library handles reading and writing multiple DEX files maintaining their initial structure. Furthermore, the multidexlib2 library checks the number of code entities (e.g. the number of methods, fields, types) for overflow and raises an exception when the DEX pool has overflown.

However, multidexlib2 only allows patching existing code while checking and raising overflow exception. Multidexlib2 does not implement creating and rearranging of additional DEX files when overflow conditions are encountered. Moreover, multidexlib2 can't handle too long classes when the number of fields exceeds the DEX limitation. Furthermore, multidexlib2 does not handle the length of method limitation. These features are required to instrument Android APKs for code coverage measurement. Thus, multidexlib2 is not a suitable solution for instrumenting multidex applications.

To the best of our knowledge there is no other state of the art solutions addressing the above mentioned DEX limitations. Thus, a person skilled in the art would not find the reported below solutions to achieve same of similar results. Definitions for Clarity in this Description:

"Primary smali directory" denotes the smali directory corresponding to the first/primary DEX file of the applications.

"Supplementary directory" denotes any smali directory other than the primary smali directory used to store classes for additional DEX files and/or instrumentation-generated classes. Examples include directories named smali_classes2, smali_classes3, and so forth.

"Instrumentation metadata class" denotes a class generated per DEX file to define and initialize probe arrays associated with instrumentation classes of that DEX file (for example, an AcvReporter class as described herein).

"Execution-tracking code" or "probe" denotes code inserted in smali that, when executed, records coverage information at a granularity comprising at least one of instruction-level or method-level.

"ACV" denotes supplementary classes and functionality related to the ACVTool code coverage measurement approach: all classes whose names begin with "Acv", such as AcvReporter, AcvInstrumentation, AcvStoring, and AcvReporterFields.

BRIEF SUMMARY

The present invention addresses the deficiencies of the state-of-the-art Android app instrumenting technique applied on already compiled single-DEX APK files. The invention extends the fine-grained code coverage measurement on multidex Android apps.

In the description below it is shown that multidex Android apps can be instrumented for code coverage measurement by applying additional steps to overcome the above-mentioned DEX format limitations.

The original steps included: original Android app disassembling; probes placing into a single smali directory, supplementary smali classes adding into the same directory, assembling, the instrumented app executing, the probes execution information pulling, code coverage report generating for the corresponding DEX file.

According to advantageous embodiment, additional steps are required when instrumenting the Android app as follows: instrumenting multiple DEX files, creating supplementary smali_classes directories for instrumentation-generated classes, adding supplementary smali classes to a supplementary directory separate from original application classes, rearranging supplementary files into additional supplementary directories if a projected entity count would exceed DEX limits, and correlating received probe execution data with smali code to generate a multidex coverage report while preserving original class paths and multidex structure.

Thus, the solution enables fine-grained code coverage measurement among multiples DEX files of a multidex Android app by introducing a novel computer-implemented method for generating and storing smali classes with regards to app instrumenting.

a. illustrates the original smali code directories of the disassembled multidex APK.

b. illustrates the result of adding of two more smali code directories that store supplementary ACV classes.

Figure 3:
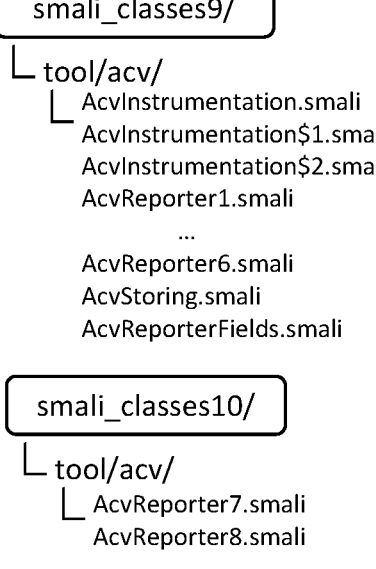

FIG. 3 is an example of supplementary classes placed into the instrumented app.

Figure 4:
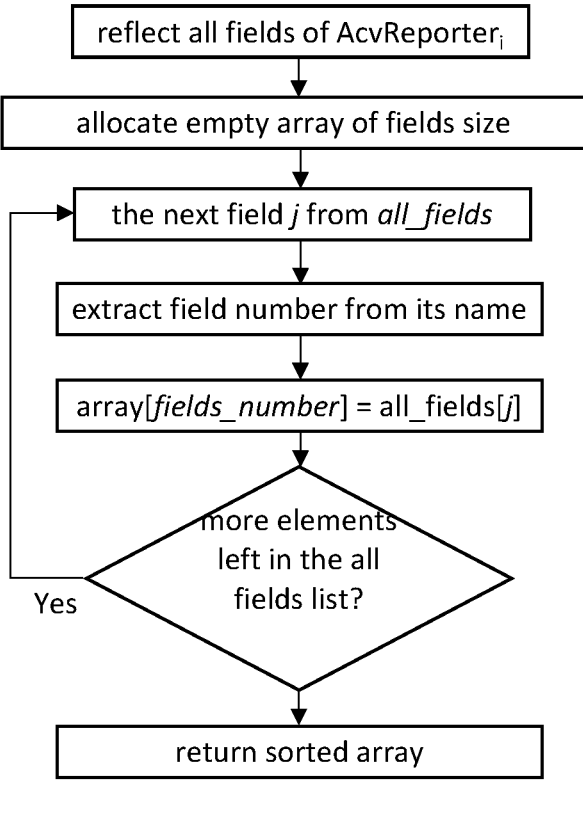

FIG. 4 illustrates the algorithm of AcvReporter fields reflecting and ordering.

DETAILED DESCRIPTION

The present invention expands the existing single-DEX instrumentation approach on multidex Android apps by addressing the above-mentioned DEX limitations. It aims at enabling whole app code coverage measurement at the instruction level in multidex Android apps.

Figure 1:
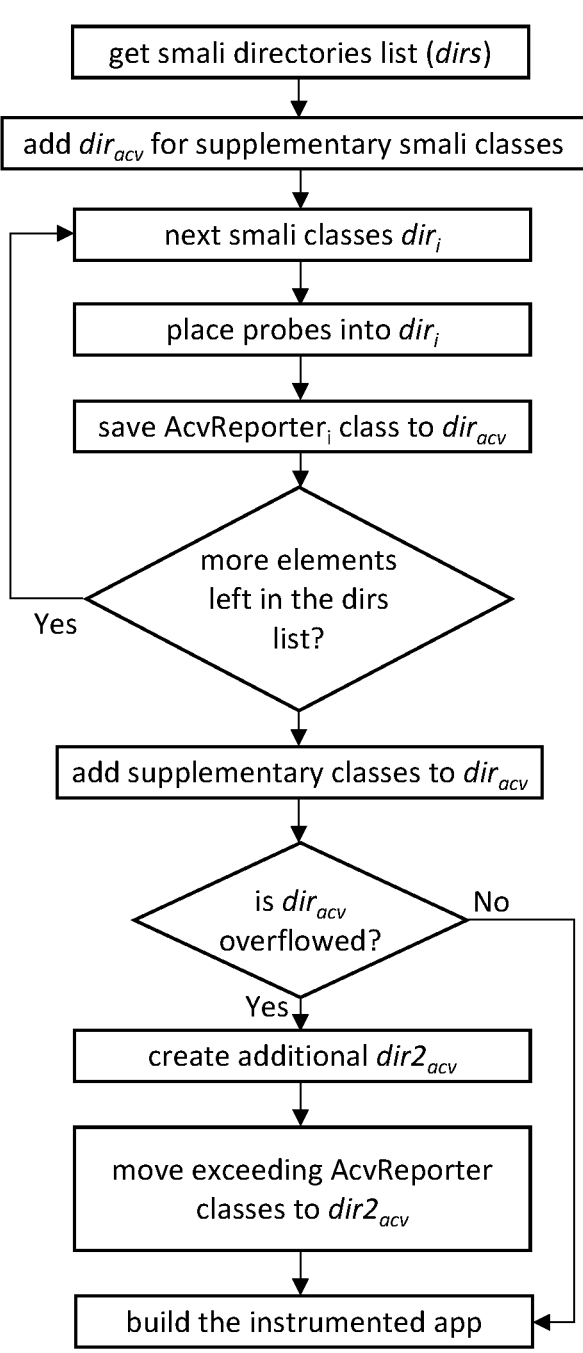
FIG. 1 illustrates the multidex Android app instrumenting flow with regards to the Android DEX format limitations.

FIG. 1 illustrates the multidex Android app instrumenting process with regards to DEX format limitations. First, the smali directories list 'dirs' is retrieved. Next, an additional smali classes directory $dir_{acv}$ is created for supplementary smali classes that accumulate, process and store probes execution information. Each smali directory dir, gets instrumented by inserting probes over smali classes.

Then, ACVTool creates the AcvReporter, smali class per each smali directory $dir_{acv}$ The AcvReporter classes are placed into the $dir_{avc}$ directory. Each AcvReporter class initializes arrays to keep information about probes execution. As soon as all smali directories are instrumented, ACVTool adds other supplementary classes into the $dir_{acv}$ directory.

The next step is to check the $dir_{acv}$ directory for exceeding the DEX format limitations. If the number of methods or the number of fields exceed 65535, an additional $dir2_{acv}$ is created. In this case, the AcvReporter classes that exceed these limits are moved to the $dir2_{acv}$ directory. More smali directories may be created correspondingly if the $dir2_{acv}$ directory has reached the limits, too.

Figure 2:
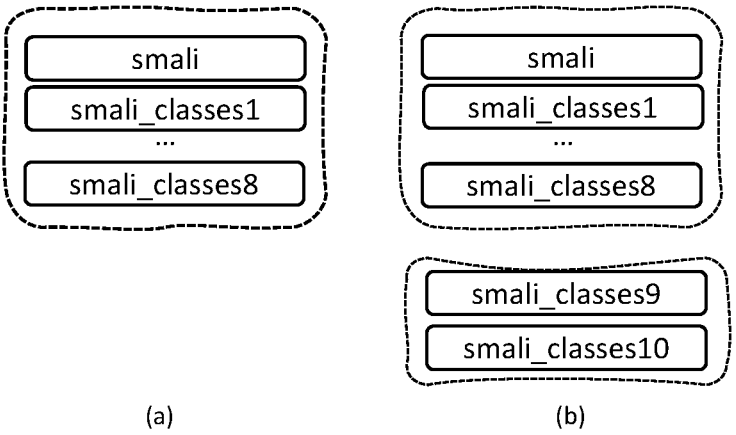
FIG. 2 illustrates an example of the smali directories evolution of the disassembled multidex APK due to app instrumenting with the following subfigures.

FIG. 2 illustrates an example of the smali code directories evolution of the disassembled multidex APK in the process of probes insertion. In this example the disassembled original APK contained 8 smali code directories named smali, smali_classes2, and so on up to smali_classes8 as it is shown in the subfigure (a). These 8 smali directories correspond to 8 DEX files located inside the original APK.

In the subfigure (b) two more smali directories were added to keep the above-mentioned supplementary classes. The presence of the smali_classes10 directory confirms that ACV classes overflow the DEX limit of one smali_classes9 directory. Therefore a few AcvReporter, classes were moved to the additional smali_classes10 directory.

FIG. 3 illustrates descriptions of ACV files under smali_classes9 and smali_classes10 directories.

FIG. 3 illustrates ACV files descriptors under the 'smali_classes9' and 'smali_classes10' directories. They contain supplementary smali classes that collect, process and store probes execution information. Classes AcvInstrumentation.smali, AcvInstrumentation$1.smali, AcvInstrumentation$2.smali, AcvStoring.smali contain the functionality for instrumentation and storing the probe execution. The AcvReporter classes perform the initialization of probes arrays used by classes in the corresponding instrumented smali directory. Each AcvReporter class is labeled correspondingly to the smali directory number (e.g. AcvReporter1.smali for the 'smali' directory). As soon as the number of references reaches 65536 in 'smali_classes9', the new directory 'smali_classes10' emerges. The additional AcvReporter classes that surpass the DEX limit of 'smali_calsses9' directory are being stored in the additional smali classes directory ('smali_classes10' in this example).

The AcvReporterFields class implements the functionality of reading fields of AcvReporter; classes by using reflection API, ordering fields by relying on the fields naming convention.

AcvStoring and Acvnstrumentation classes further store the final probes execution information to binary files, one file per each instrumented smali classes directory. Afterwards, the multidex code coverage report is to be generated by using probes execution information and the smali representation of the multidex Android app.

FIG. 4 depicts the process of reflecting of AcvReportern fields while ensuring that the expected order is maintained. This solution is implemented as part of the AcvReporterFields class, as indicated in the FIG. 3. This solution is to bypass the method length DEX limitation initially faced in the public version of ACVTool. As a result of advantageous embodiment of the tool is now can capable of instrumenting up to 65K classes, a substantial improvement over the previous limit of 16K in the single-DEX version.

To generate code coverage report in multidex format, ACVTool processes each binary file (the .ec file) and the smali code tree for the corresponding DEX file the same way as it worked the single-DEX ACVTool version. ACVTool stores all generated HTML (or XML) files according to their class paths. Thus, the final directory contains all the smali coverage HTML files merged from multiple smali directories.

The embodiment of this invention is an extension to the publicly available software tool called ACVTool or a new software package alternatively implemented in any programming language.

Some embodiments of this invention may comprise a system that runs locally or hosted on a server. In case of a server, it could be responsible for preparing the instrumented version of an Android app. When the app is instrumented, the user would be able then to download it and test the app locally. Alternatively, app testing could be run on the server side provided that the user has the necessary functionality for test guidance. Finally, the code coverage report could be generated at the server side, too.

The terms and conventions used in the text of this disclosure and presented on the figures are to be considered as not restrictive and may not bound the scope of this invention. For example, names of directories mentioned in the text and on the figures may vary, names and the structure of implemented classes may vary, the probe storying mechanisms may vary, code coverage report format may vary. Moreover, the described methods may include additional steps, the steps may follow different order or can be done in parallel.

What is claimed is:

1. A computer-implemented method executed by at least one processor with access to a memory for instrumenting a compiled multidex Android application comprising a plurality of compiled Dalvik Executable (DEX) files and generating a coverage report, the method comprising:

disassembling each compiled DEX file into smali bytecode organized in a primary smali directory and one or more supplementary directories;

inserting execution-tracking code into the smali bytecode at a granularity comprising at least one of instruction-level or method-level;

generating, for each DEX file, a respective instrumentation metadata class defining probe arrays associated with instrumented classes of that DEX file;

storing the instrumentation metadata classes and supplementary instrumentation classes in at least one supplementary directory separate from original application classes;

determining, based on DEX format constraints, that a projected count of entities for a directory would exceed a DEX limit;

responsive to the determining, creating an additional supplementary directory and relocating at least a portion of the instrumentation metadata classes to the additional directory until the DEX limits are satisfied for each directory;

assembling the instrumenting application while preserving original class paths and multidex structure; and receiving probe execution data generated during execution of the instrumented application and generating a multidex code coverage report by correlating the probe execution data with the smali bytecode for corresponding DEX files.

2. The method of claim 1, further comprising ordering, by reflection, fields in the instrumentation metadata class based on numeric suffixes to maintain deterministic probe index mapping and to bypass method-length constraints.

* * * * *